United States Patent Office 2,959,370
Patented Nov. 8, 1960

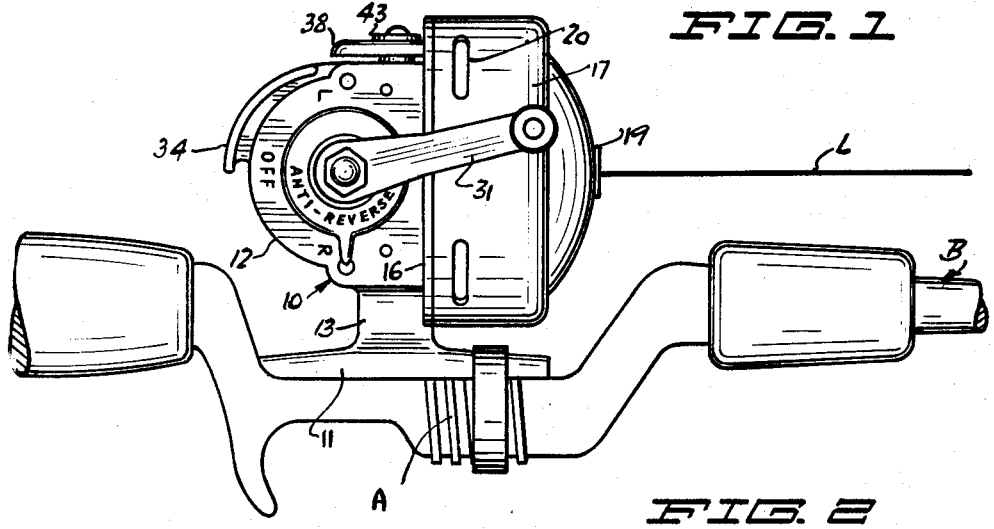
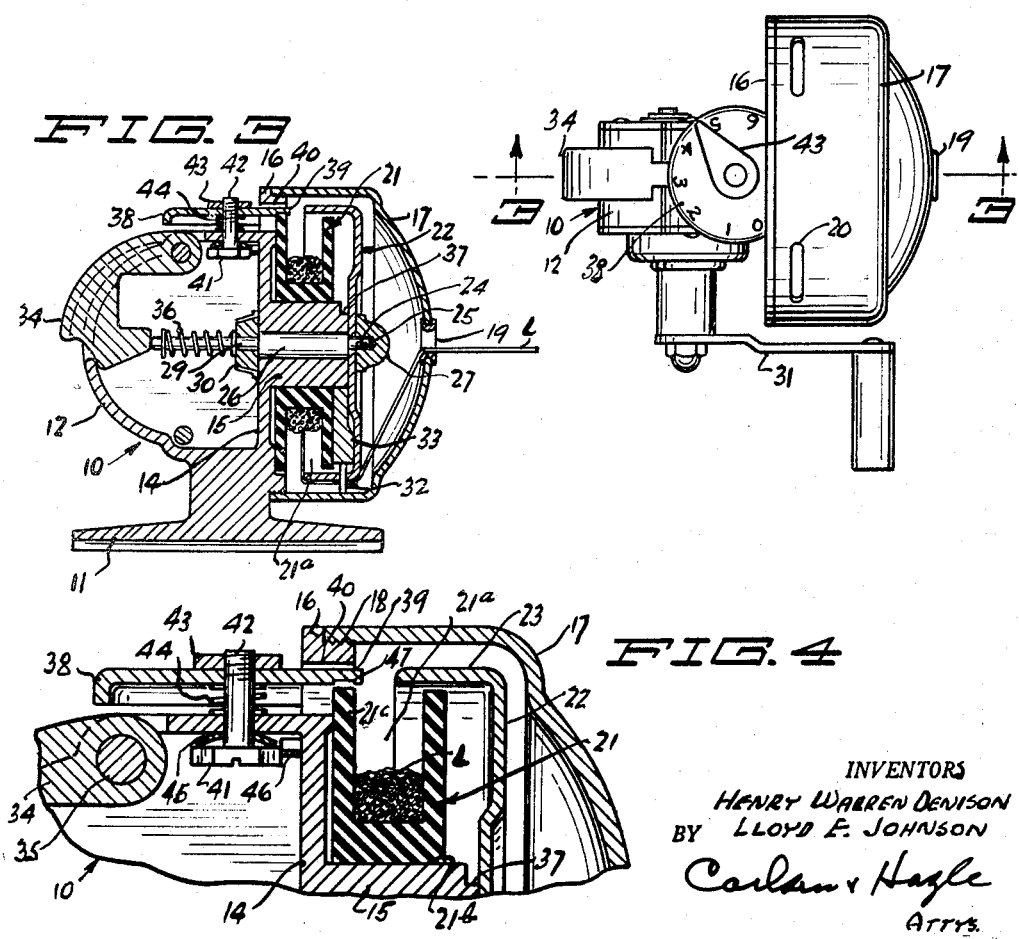

2,959,370

DRAG FOR SPINNING REEL

Henry Warren Denison and Lloyd E. Johnson, both % Denison-Johnson Inc., 720 Minneopa Road, Mankato, Minn.; F. Evelyn Denison, special administratrix of the estate of said Henry Warren Denison, deceased Original application Dec. 6, 1955, Ser. No. 551,297, now Patent No. 2,862,679, dated Dec. 2, 1958. Divided and this application Aug. 5, 1957, Ser. No. 676,079

6 Claims. (Cl. 242—84.5)

Our invention relates to improvements in fishing reels of the type in which the line carrying spool does not revolve as the line is cast, so that the reel will not backlash, such reels being commonly known as spinning reels.

The general type of reel with which our present invention is concerned is that shown in our prior Patents Nos. 2,644,647 and 2,667,312, as well as in our copending application Serial No. 551,297, filed December 6, 1955, now Patent No. 2,862,679, from which this application is a division. The reels are of the so-called closed spool variety and have a frame including a removable cover over the line spool, with said cover having an opening out through which the line passes. The spool is normally stationary and line is coiled upon the spool by a rotary member having a controlled projectable pick-up element to engage the line. A crank is operatively arranged to rotate said rotary spooling member and a thumb or control piece is provided to release the line for casting as well as to snub the line at the end of a cast.

One very desirable feature of fishing reels of this nature, in addition to their fool-proof operation with no backlash problem, lies in that they may be used with very light monofilament lines, as is well known to all skilled in the art. Such lines, having relatively low breaking points, must be manipulated with care in playing a heavy fish and in the reels of our design provision in the form of an adjustable drag is made to allow controlled rotation of the line spool under the pull of the line so that, even though the fisherman may be turning the crank of the reel in the attempt to bring in the fish, the line may actually be running out from the reel as the fish pulls. If this action is properly controlled the fish will not break the line even though exerting a pull greater than the breaking strength or test of the line.

It is the primary object of our present invention to provide an improved drag and drag adjustment mechanism which provides readily and accurately controlled resistance to such rotation of the spool as is necessary when the line is pulled from the reel by the fish, and which will function effectively to permit the line to flow from the reel when the line tension is safely below the breaking point of the line itself. Another object is to provide a drag adjustment which includes a scale and cooperating indicator pointer which cooperate to accurately represent the magnitude of the frictional braking action on the spool, and to provide an indicator which bears reference to the beaking strength of the line in use, but which adjustment may also be readily varied (as to its overall range of friction effective on the spool) in a simple manner when changing to heavier or lighter lines or to compensate for wear.

These and other more detailed and specific objects will be disclosed in the course of the following specification, reference being had to the accompanying drawings, in which—

Fig. 1 is a side elevation of our reel showing the same as mounted upon the reel seat of a fishing rod of the bait casting variety.

Fig. 2 is a top plan view of the reel alone.

Fig. 3 is a diametrical sectional view along the line 3—3 in Fig. 2, the reel drive crank and its associated gear being omitted.

Fig. 4 is an enlarged fragmentary sectional view like the upper part of Fig. 3 to better illustrate the drag mechanism.

Referring now more particularly and by reference characters to the drawing the reel, as it also does in the parent application, comprises a frame which is designated generally at 10, having the usual tang 11 by which the reel is mounted upon the conventional reel seat A of a fishing rod, designated generally at B. It will be understood that our reel is useful on the ordinary bait casting rod, spinning rod or flyrod and as has been pointed out in detail in our parent application the reel is completely reversible in order to accommodate it to use on all such rods, and for either left or right-hand operation. The mechanism and the manner by which such reversibility of the reel is carried out will not be set forth in detail herein since they are not material to an understanding of the present invention.

The frame 10 includes an arcuate housing wall 12 connected to the aforesaid tang 11 by means of a stem or shank 13 and forwardly of said housing wall the frame further includes a circular end plate 14 formed with a stationary, tubular and forwardly extending bearing 15. In addition said end wall 14 has a forwardly directed peripheral threaded flange 16 onto which the rear end of a cover 17 may be threaded, as indicated at 18 (Fig. 4). The rear portion of said cover 17 is cylindrical in shape but forwardly thereof the cover is rounded off toward the center at which there is located a line guide eyelet or grommet 19. When this cover is disposed in place upon the frame 10 it encloses the forwardly located working components of the reel, but the cover is provided with a series of openings 20 providing for air circulation as necessary to dry the parts within the cover.

The fishing line L is wound upon a line spool, designated generally at 21, which is positioned around the aforesaid bearing 15 up against the forward face of the end wall 14, as clearly shown in Fig. 3. This line spool 21 is formed with a groove 21ª opening outwardly so that the line L may be wound in multiple convolutions around the core of the spool and the spool has a center opening 21ᵇ (Fig. 4) to closely fit the bearing 15. Located forwardly of the spool 21 is a spooling member 22, circular in shape and provided with a rearwardly extending cylindrical flange 23 which projects rearwardly over and outwardly of the peripheral edge of the spool in the normal position of the parts, as is seen in Fig. 3. At its center the spooling member 22 has an opening 24 to accommodate the reduced and threaded forward end 25 of an actuating shaft 26, to which shaft the spooling member is releasably fastened by means of a cap nut 27. The hollow bearing 15 slidably and rotatably accommodates this shaft 26 and at a point immediately to the rear of the end wall 14 the shaft is again reduced, as indicated at 29, for slidable but relatively non-rotatable engagement with a drive pinion 30. This drive pinion 30 is engaged and driven by a gear (not shown) operated by the usual crank 31 so that when this crank is turned the spooling member 22 will be rotated, as will be readily understood. Normally projecting beyond the peripheral surface of the flange 23 of spooling member 22 is a pick-up pin or element 32 and the line L as it passes from the spool 21, forwardly across said flange 23 and then inwardly toward center and out through the eyelet 19, will be engaged by this pick-up pin 32 so that as the spooling member is rotated the line will be placed in coils upon the spool 21. To free the line for casting the pick-up pin 32 is retracted inwardly toward the axis of rotation of the spooling member 22 leaving the flange 23 clear of any obstructions so that the line may flow freely off the spool 21 without requiring rotation of the latter. Here again the mechanism for so positioning the pick-up pin or element 32 has been described in detail in our prior patents and the parent application hereinbefore identified and it is believed sufficient at this point to note only that the pin is carried in a carrier 33 movably mounted within the spooling member 22 and normally biased to move in an inward direction. The inner end of the carrier 33 rests upon the forward end of the bearing 15, but by the actuation of a control member or thumb piece 34 which pivots about a cross pin 35 (Fig. 4) the shaft 26 may be thrust in a forward direction carrying the spooling member forward until the carrier 33 clears the end of the bearing 15, whereupon the line may be cast. Such forward motion of the shaft 26 and spooling member 22 is yieldably resisted by means of an expansion coil spring 36 on the rear portion of the shaft and which also serves to hold the drive pinion 30 in position against the rear face of the end plate 14. When the spooling member 22 is thrust forward to its forwardmost position the line L will be snubbed between an outer portion of this member and the inner surface of the cover 17 so that control may be exercised over the outward flow of the line and the same may be snubbed at the end of a cast. When the control member 34 is then released and the crank 31 turned to initiate the rewinding of the line the spring 36 tends to restore the shaft 26 to its original position and, as the shaft turns, a cam surface 37 on the forward end of the bearing 15 will engage the inner end of the carrier 33 and again project the pick-up pin 32 outward to its line winding position.

As thus far described the structure of the reel is essentially like that disclosed and claimed in our copending application identified supra and it will be understood that while the line spool 21 is normally stationary it is permitted adjustably retarded or braked rotation, as is necessary in order to permit the line L to flow from the reel when playing a heavy fish. Thus while the fisherman may be turning the crank 31, and thus rotating the spooling member 22 to cause the pick-up pin or element 32 to tend to spool the line upon the spool, this rotation of the spool itself will permit the same to turn and the line actually to move in the opposite direction or outward from the reel. The mechanism for controlling the spool will now be described. A drag member or dial plate 38 is provided and the same is partially circular but has a spool engaging end 39 projecting forwardly through an opening 40 in the end plate 14 and overlying the rim of the adjacent flange 21c (Fig. 4) of the line spool 21. The flange rim forms a convenient way of providing a circular drag engaging surface. The opening 40 is so dimensioned that the end 39 of the drag plate may move radially with respect to the axis of the spool. The head 41 of a cap screw 42 which projects loosely through the adjacent housing wall 12 is located inside the wall and the screw is tapped into a pointer 43. The screw 42 passes loosely through the dial plate 38. Located on the screw 42 between wall and dial plate is an expansion coil spring 44 which normally biases the latter in a radial direction away from the axis of the spool and the shaft 26. One or more bowed spring washers 45 (Fig. 4) are disposed between the head 41 of the screw and the inside of wall 12 and this screw head, which is other than circular in shape and has the usual screwdriver kerf, is normally held against rotation when up against the inside of the wall 12 by stops 46. As stated the pointer 43 is threaded on the screw 42 and plays over a scale of numerals or other indicia on the exposed face of the drag plate 38 as is best seen in Fig. 2. Where the end 39 of the drag plate crosses the rim of the spool flange 21c there is formed a very shallow groove 47 as seen in Fig. 4.

The position of the drag pointer 43 will determine and designate the amount of frictional drag exerted on the rim of the spool flange 21c by the end 39 of the drag plate, turning the pointer clockwise (as viewed in Fig. 2) screwing the pointer onto the screw and thus pulling the end 39 down tighter upon the flange rim, and vice versa. In removing the spool 21 to reverse it or to change to another carrying another line the drag is adjusted to the zero or "off" position so that the flange rim may slip from the shallow groove 47. By pressing downward, as viewed in Fig. 4, upon the drag plate 38 the screw head 41 will clear the stops 46 and the screw can then be adjusted to vary the range of drag pressures exerted on the spool rim in the various positions of the pointer 43, also as will be understood.

The position of the pointer 43 on the scale of numerals or other indicia on the dial plate and drag member 38 will quite accurately reflect the magnitude of the drag or brake resistance imposed by the drag member on the spool 21 to retard rotation thereof. In fact, by proper adjustment, the pointer position may be referenced to the tensile strength of the line L and the fisherman will be guided in adjusting the drag so that the reel will release the line safely before its breaking point is reached.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a fishing reel having a frame with a rotatably mounted line spool and a winding mechanism for winding line on the spool, the said spool having a flange with a circular rim, a drag mechanism which comprises a spring biased drag member bearing radially inward on the rim of said flange to frictionally resist rotation of the spool, the frame having an aperture, a screw disposed through the aperture and engaging said drag member for adjusting the amount of friction exerted on the flange rim, and means normally holding the screw against rotation but effective on manual pressure directed parallel to a line through the aperture on the drag member and axial movement of the screw to release the screw for rotation with respect to the drag member for adjusting the same.

2. In a fishing reel having a rotatably mounted line spool and a winding mechanism for winding line on the spool, the said spool having a flange with a circular rim, a drag mechanism which comprises a spring biased drag and indicator assembly bearing radially inward on the rim of said flange to frictionally resist rotation of the spool, a member having an aperture and stationarily associated with the reel, a screw disposed through the aperture and engaging said assembly for adjusting the amount of friction exerted on the flange rim, and means normally holding the screw against rotation but effective on movement of the assembly in a direction axially of the screw to release the screw for rotation with respect to the assembly for adjusting the same.

3. In a fishing reel having a frame with a line spool rotatably mounted thereon and a mechanism for winding a line on the spool, the line spool having a circular drag engaging surface, a stationary screw extending through the frame, an indicator threaded on the screw, a drag plate disposed about the screw between the indicator and the frame, a compressed spring disposed between the frame and the plate urging it against the indicator as support therefor in the axial direction of the screw, the drag plate being in frictional contact with said surface and non-rotatable with respect to the frame, and the indicator being rotatable on the screw for providing movement of the plate with respect to the surface for variably frictionally engaging same.

4. In a fishing reel having a frame with a line spool rotatably mounted thereon and a mechanism for winding a line on the spool, the line spool having a circular drag engaging surface, a screw slidably extending through a frame portion and being axially movable between first and second axial positions, a spring urged drag plate disposed about and engaging the screw for yieldably urging it to a first axial position, an indicator member on the screw and being rotatable with respect to the drag plate for axially moving the plate to urge it to variably frictionally engage the surface in a predetermined range of drag pressures, means on the reel engaging the screw when in the first axial position for holding it against rotation with respect to the plate, and the screw being axially movable against the spring urging to the second axial position wherein the screw is freed from said means for rotation to adjust the said range of drag pressures.

5. In a fishing reel having a line spool rotatably mounted therein and a mechanism for winding a line on the spool, the line spool having a circular drag engaging surface, a screw in the reel axially movable between first and second axial positions and spring urged to the first position, a drag plate variably frictionally engaging the surface and disposed about the screw, an indicator member on the screw and being rotatable with respect to the reel for axially displacing the plate with respect to the screw to vary the frictional engagement with the surface in a range of drag pressures, means engaging the screw in the first position for limiting axial movement of the plate by limiting screw rotation with respect thereto, and the screw being freed from said means when moved to the second axial position for permitting free rotation thereof with respect to the plate for adjusting the range of drag pressures.

6. In a fishing reel having a rotatably mounted line spool and a winding mechanism for winding line on the spool, said spool having a flange with a circular rim, a drag mechanism which comprises a spring biased drag member bearing radially inward on the rim of said flange to frictionally resist rotation of the spool, a screw engaging said drag member for adjusting the amount of friction exerted on the flange rim, means engagable by said screw for preventing rotation thereof with respect to said spring biased drag member, said spring biased drag member normally urging said screw toward engagement with said last named means, said screw being rotatable for adjustment with respect to said spring biased drag member upon the application of axial pressure to said screw so as to disengage said screw from said last named means, a graduated dial, and an indicator threaded on the screw and engaging said spring biased drag member for adjusting the friction.

References Cited in the file of this patent

UNITED STATES PATENTS

| | | |
|---|---|---|
| 779,284 | Johnson et al. | Jan. 3, 1905 |
| 1,996,697 | Cumings | Apr. 2, 1935 |
| 2,670,908 | Hill | Mar. 2, 1954 |
| 2,734,693 | Rabezzana | Feb. 14, 1956 |
| 2,772,839 | Morton | Dec. 4, 1956 |
| 2,863,616 | Hutchison et al. | Dec. 9, 1958 |